United States Patent
Bergamasco et al.

(10) Patent No.: US 7,602,720 B2
(45) Date of Patent: Oct. 13, 2009

(54) ACTIVE QUEUE MANAGEMENT METHODS AND DEVICES

(75) Inventors: Davide Bergamasco, Sunnyvale, CA (US); Flavio Bonomi, Palo Alto, CA (US); Valentina Alaria, San Francisco, CA (US); Andrea Baldini, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 682 days.

(21) Appl. No.: 11/155,388

(22) Filed: Jun. 16, 2005

(65) Prior Publication Data

US 2006/0171318 A1    Aug. 3, 2006

Related U.S. Application Data

(60) Provisional application No. 60/621,396, filed on Oct. 22, 2004.

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ............................. 370/235; 370/413
(58) Field of Classification Search ......... 370/229–235; 709/226

See application file for complete search history.

(56) References Cited

U.S. PATENT DOCUMENTS

| 5,402,416 | A | * | 3/1995 | Cieslak et al. | 370/236 |
| 5,526,350 | A | | 6/1996 | Gittins et al. | |
| 5,742,604 | A | | 4/1998 | Edsall et al. | 370/401 |
| 5,920,566 | A | | 7/1999 | Hendel et al. | |

(Continued)

OTHER PUBLICATIONS

International Search Report, mailed Oct. 18, 2006, from related International Application PCT/US05/37765, 3 pp. including Notification of Transmittal.

(Continued)

*Primary Examiner*—William Trost, IV
*Assistant Examiner*—Emmanuel Maglo
(74) *Attorney, Agent, or Firm*—Weaver Austin Villeneuve Sampson LLP

(57) ABSTRACT

Novel methods and devices are provided for AQM of input-buffered network devices. Preferred implementations of the invention control overall buffer occupancy while protecting uncongested individual VOQs. The probability of setting a "global drop flag" (which is not necessarily used to trigger packet drops, but may also be used to trigger other AQM responses) may depend, at least in part, on the lesser of a running average of buffer occupancy and instantaneous buffer occupancy. In some preferred embodiments, this probability also depends on the number of active VOQs. Moreover, a global drop flag is set in conjunction with a drop threshold M associated with the VOQs. Whether an AQM response is made may depend on whether a global drop flag has been set and whether a destination VOQ contains M or more packets. Different M values may be established for different classes of traffic, e.g., with higher M values for higher-priority traffic. AQM responses (e.g., to drop packets) may be taken more aggressively when there is a larger number of active VOQs.

37 Claims, 7 Drawing Sheets

U.S. PATENT DOCUMENTS

| | | | |
|---|---|---|---|
| 5,946,313 A | | 8/1999 | Allan et al. |
| 5,974,467 A | | 10/1999 | Haddock et al. |
| 6,021,124 A | | 2/2000 | Haartsen |
| 6,104,699 A | | 8/2000 | Holender et al. |
| 6,333,917 B1 | * | 12/2001 | Lyon et al. .................. 370/236 |
| 6,456,590 B1 | | 9/2002 | Ren et al. |
| 6,459,698 B1 | | 10/2002 | Achrya |
| 6,504,836 B1 | | 1/2003 | Li et al. |
| 6,556,541 B1 | | 4/2003 | Bare |
| 6,556,578 B1 | * | 4/2003 | Silberschatz et al. ........ 370/412 |
| 6,560,198 B1 | * | 5/2003 | Ott et al. ..................... 370/235 |
| 6,587,436 B1 | | 7/2003 | Vu et al. |
| 6,636,524 B1 | | 10/2003 | Chen et al. |
| 6,650,623 B1 | | 11/2003 | Varma et al. |
| 6,721,316 B1 | | 4/2004 | Epps et al. |
| 6,888,824 B1 | * | 5/2005 | Fang et al. .................. 370/359 |
| 6,901,593 B2 | * | 5/2005 | Aweya et al. ............... 718/104 |
| 6,904,507 B2 | | 6/2005 | Gil |
| 7,016,971 B1 | | 3/2006 | Recio et al. |
| 7,020,715 B2 | | 3/2006 | Ventakataraman et al. |
| 7,093,024 B2 | | 8/2006 | Craddock et al. |
| 7,133,405 B2 | | 11/2006 | Graham et al. |
| 7,158,480 B1 | | 1/2007 | Firoiu et al. |
| 7,197,047 B2 | | 3/2007 | Latif et al. |
| 7,209,478 B2 | | 4/2007 | Rojas et al. |
| 7,221,656 B1 | * | 5/2007 | Aweya et al. ............... 370/252 |
| 7,277,391 B1 | * | 10/2007 | Aweya et al. ............... 370/235 |
| 7,286,485 B1 | * | 10/2007 | Ouellette et al. ............ 370/252 |
| 7,349,336 B2 | * | 3/2008 | Mathews et al. ............ 370/230 |
| 2002/0085493 A1 | | 7/2002 | Pekkala et al. |
| 2002/0085565 A1 | | 7/2002 | Ku et al. |
| 2002/0141427 A1 | | 10/2002 | McAlpine |
| 2002/0159385 A1 | | 10/2002 | Susnow et al. |
| 2002/0188648 A1 | | 12/2002 | Aweya et al. |
| 2002/0191640 A1 | | 12/2002 | Haymes et al. |
| 2003/0002517 A1 | | 1/2003 | Takajitsuko et al. |
| 2003/0037127 A1 | | 2/2003 | Shah et al. |
| 2003/0061379 A1 | | 3/2003 | Craddock et al. |
| 2003/0084219 A1 | | 5/2003 | Yao et al. |
| 2003/0115355 A1 | | 6/2003 | Cometto et al. |
| 2003/0118030 A1 | | 6/2003 | Fukuda |
| 2003/0152063 A1 | | 8/2003 | Giese et al. |
| 2003/0169690 A1 | | 9/2003 | Mott |
| 2003/0195983 A1 | | 10/2003 | Krause |
| 2003/0223416 A1 | | 12/2003 | Rojas et al. |
| 2004/0008675 A1 | | 1/2004 | Basso et al. |
| 2004/0013088 A1 | | 1/2004 | Gregg |
| 2004/0032856 A1 | | 2/2004 | Sandstrom |
| 2004/0042448 A1 | | 3/2004 | Lebizay et al. |
| 2004/0076175 A1 | | 4/2004 | Patenaude |
| 2004/0081203 A1 | | 4/2004 | Sodder et al. |
| 2004/0100980 A1 | | 5/2004 | Jacobs et al. |
| 2004/0120332 A1 | | 6/2004 | Hendel |
| 2004/0156390 A1 | | 8/2004 | Prasad et al. |
| 2004/0213243 A1 | | 10/2004 | Lin et al. |
| 2005/0002329 A1 | | 1/2005 | Luft et al. |
| 2005/0141419 A1 | | 6/2005 | Bergamasco et al. |
| 2005/0141568 A1 | | 6/2005 | Kwak et al. |
| 2005/0190752 A1 | | 9/2005 | Chiou et al. |
| 2005/0238064 A1 | | 10/2005 | Winter et al. |
| 2006/0023708 A1 | | 2/2006 | Snively et al. |
| 2006/0087989 A1 | | 4/2006 | Gai et al. |
| 2006/0098589 A1 | | 5/2006 | Kreeger et al. |
| 2006/0098681 A1 | | 5/2006 | Caifiero et al. |
| 2006/0101140 A1 | | 5/2006 | Gai et al. |
| 2006/0251067 A1 | | 11/2006 | Desanti et al. |
| 2007/0081454 A1 | | 4/2007 | Bergamasco et al. |
| 2007/0183332 A1 | | 8/2007 | Oh et al. |

OTHER PUBLICATIONS

Written Opinion of the International Searching Authority, mailed Oct. 18, 2006, from related International Application PCT/US05/37765, 7 pp.

PCT Search Report mailed Sep. 27, 2007, from International Application No. PCT/US06/38858, including Notification of Transmittal, (4 pp.).

PCT Written Opinion of the International Searching Authority mailed Sep. 27, 2007, from International Application No. PCT/US06/38858 (6 pp.).

J. Moy, OSPF Version 2 (RFC 2178), Network Working Group, Cascade Communications Corp., Jul. 1997, 211 pp.

"InfiniBand" from Wikipedia, downloaded Feb. 16, 2007 from the internet at http://en.wikipedia.org/wiki/InfiniBand 3 pp.

International Search Report, dated Sep. 21, 2006 from corresponding International Application No. PCT/US05/37069, including Notification of Transmittal; and Written Opinion of the International Searching Authority, dated Sep. 21, 2006 from corresponding International Application No. PCT/US05/37069, 11 pp.total.

International Search Report, mailed Jan. 16, 2007, from related International Application No. PCT/US05/37239, including Notification of Transmittal; and Written Opinion of the International Searching Authority, mailed Jan. 16, 2007, from related International Application No. PCT/US05/37239, 14 pp total.

International Search Report, mailed Feb. 20, 2007, from related International Application No. PCT/US05/37651, including Notification of Transmittal; and Written Opinion of the International Searching Authority, mailed Feb. 20, 2007, from related International Application No. PCT/US05/37651, 7 pp total.

International Search Report, mailed Nov. 1, 2006 from corresponding International Application No. PCT/US05/36700, 3 pp. including Notification of Transmittal.

Written Opinion of the International Searching Authority, mailed Nov. 1, 2006 from corresponding International Application No. PCT/US05/36700, 5 pp.

U.S. Appl. No. 10/777,886, entitled "End-to-End Congestion Control", filed Dec. 18, 2001.

Office Action mailed Jan. 24, 2008 for U.S. Appl. No. 11/152,991.
Office Action mailed Jan. 30, 2008 for U.S. Appl. No. 11/078,992.
Office Action mailed Feb. 21, 2008 for U.S. Appl. No. 11/094,877.
Office Action mailed Mar. 31, 2008 for U.S. Appl. No. 11/084,587.

InfiniBand Arch, Spec, vol. 1.
InfiniBand Arch, Spec, vol. 2.

K. Ramakrishnan et al., "The Addition of Explicit Congestion Notification (ECN) to IP," RFC 3168, Sep. 2001.

Sancho et al.; "Analyzing the Influence of Virtual Lanes on the Performance on Infiniband Networks"; 2002; IEEE Proceeding of the International Parallel and Disctributed processing Symposium (IPDPS'02); pp. 1-10.

*IEEE Standards 802.3™—2002*, IEEE Computer Society, Mar. 8, 2002, 1513 pages.

*MAC Control PAUSE Operation*, 31B.3.1 Transmit Operation, Annex 31B, IEEE Std 802.3ae-2002, 4 pages.

*IEEE Standards 802.3ah™—2004*, IEEE Computer Society, Sep. 7, 2004, 623 pages.

*MAC Control PAUSE Operation*, 31B.1 PAUSE description, Annex 31B, IEEE Std 802.3, 1998 Edition, 11 pages.

*IEEE Standards 802.3ak™—2004*, IEEE Computer Society, Mar. 1, 2004, 42 pages.

*31. MAC Control*, IEEE Std 802.3-2002, Section Two, 9 pages.

Mekkittikul et al., *A Practical Scheduling Algorithm to Achieve 100% Throughput in Input-Queued Switches*, Computer Systems Laboratory, Stanford University, 8 pages.

Floyd et al., *Random Early Detection Gateways For Congestion Avoidance*, Lawrence Berkeley Laboratory, Univ. of California, IEEE/ACM Transactions on Networking, Aug. 1993, 22 pages.

WIPO International Search Report and Written Opinion mailed on Jun. 4, 2008 in International Application No. PCT/US2007/066027.

USPTO Office Action mailed Jul. 3, 2008 in U.S. Appl. No. 11/400,671.

\* cited by examiner

ACTIVE QUEUE MANAGEMENT METHODS AND DEVICES

CROSS-REFERENCE TO RELATED APPLICATIONS

This application claims priority to U.S. Provisional Application No. 60/621,396, entitled "FC Over Ethernet" and filed on Oct. 22, 2004, which is hereby incorporated by reference in its entirety. This application is related to U.S. patent application Ser. No. 11/084,587, entitled "Ethernet Extension for the Data Center" and filed on Mar. 18, 2005, to U.S. patent application Ser. No. 11/078,992, entitled "Fibre Channel Over Ethernet" and filed on Mar. 10, 2005 and to U.S. patent application Ser. No. 11/094,877, entitled "Network Device Architecture for Consolidating Input/Output and Reducing Latency" and filed on Mar. 30, 2005, (the "Cross-Referenced Applications"), all of which are incorporated by reference for all purposes.

BACKGROUND OF THE INVENTION

Congestion avoidance techniques are essential to the operation of networks and network devices. One such technique known in the art as "Random Early Discard" or "RED" is described in a publication by S. Floyd and V. Jacobson entitled "*Random Early Detection Gateways for Congestion Avoidance*," (Transactions on Networking, August 1993), which is hereby incorporated by reference for all purposes.

The basic principle behind RED is to control the average length of a network device's (e.g., a router's) output queue in order to avoid long term congestion. To achieve this goal, RED must work tightly coupled with transport protocols, such as TCP, which are equipped with their own congestion avoidance mechanisms and are thus capable to react to congestion indications generated by RED routers.

FIG. 1 includes graph 100 that illustrates how RED works. For each incoming packet, the average queue length is calculated. (Please note that the terms "packet" and "frame" may be used interchangeably herein.) If the average queue length is below a predefined minimum threshold 105, the packet is accepted and stored in the output queue for transmission. If the average queue size is above the minimum threshold 105 but below a predefined maximum threshold 110, a packet marking probability is computed and the packet gets marked according to this probability. The marking probability is proportional to the average queue size. Therefore, when the queue is larger, there is a higher probability for an incoming packet to get marked. Finally, if the average queue size is above the maximum threshold 110, all incoming packets are marked until the average queue size falls again below the maximum threshold 110.

It is responsibility of the transport protocol to take the appropriate countermeasures when it detects packets marked by RED. When TCP is being used in the absence of an explicit method of marking packets, packets can only be "marked" by discarding them, with TCP interpreting the loss of packets as a congestion indication. When packet drops are detected, TCP sources immediately reduce their transmission rate, causing a reduction of the traffic volume at the congested router(s). Discarding packets is also a useful means to control average queue size when non-reactive transport protocols such as UDP are exploited. The RED algorithm has been implemented in some output-buffered network devices, including the Catalyst 6500 switch and the 7200 series router provided by Cisco Systems, Inc., to prevent congestion of output buffers.

It would seem to be desirable to deploy an active queue management ("AQM") technique such as RED in input-buffered switches to keep congestion of input buffers and Virtual Output Queues ("VOQs") under control. However, the RED algorithm presents scalability issues and other challenges. In an output-buffered network device having N ports, at least N instances of the RED algorithm need to be applied. It may not be feasible to have a dedicated instance of the RED mechanism associated with each VOQ of an input-buffered network device. In such a device, there could be thousands of VOQs mapped on a physical buffer. Because each input buffer implements a VOQ for each output of the system, $N^2$ instances of the RED algorithm would need to be deployed for an input-buffered switch having N ports. It would be both difficult and expensive to provide an average queue length estimator to each VOQ.

If one were to apply a traditional RED algorithm on an entire buffer shared by many VOQs, flows that are not contributing to congestion could be adversely affected. On the other hand, if a traditional RED method were applied on a per-VOQ basis for potentially thousands of VOQS, each queue could be too small to obtain a meaningful average occupancy value, particularly if the buffer is small with respect to the number of VOQS.

Considering the foregoing, a traditional RED method would not seem to be a desirable way to implement AQM for input-buffered switches. It would be desirable to implement methods and devices that overcome at least some of the aforementioned shortcomings of the prior art.

SUMMARY OF THE INVENTION

Novel methods and devices are provided for AQM of input-buffered network devices. Preferred implementations of the invention control overall buffer occupancy while protecting uncongested individual VOQs.

According to some aspects of the invention, the probability of setting a "global drop flag" depends, at least in part, on the lesser of a running average of buffer occupancy and instantaneous buffer occupancy. As noted elsewhere herein, a "drop flag" is not necessarily used to trigger packet drops, but may also be used to trigger other AQM responses. Similarly, the term "drop probability" and the like do not necessarily relate to dropping packets, but can be used with regard to other types of AQM responses. In some preferred embodiments, this probability also depends on the number of active VOQs.

Moreover, a global drop flag is preferably set in conjunction with a drop threshold M associated with the VOQs. Whether an AQM response is made preferably depends on both whether a global drop flag has been set and whether a destination VOQ contains M or more packets. Some implementations set different M values for different classes of traffic, e.g., with higher M values for higher-priority traffic. AQM responses (e.g., to drop packets) may be taken more aggressively when there is a larger number of VOQs. Therefore, M is preferably smaller when there is a larger number of active VOQs.

Some implementations of the invention provide an active queue management ("AQM") method that includes these steps: receiving an incoming packet; estimating an overall occupancy level O of an input buffer; determining a number N of active virtual output queues ("VOQs") of the input buffer; computing a probability P based on the overall occupancy level and the number of VOQs; generating a random number R; and setting a flag when R is less than P. Preferably, P increases when N increases.

In some such implementations, O is a running average occupancy level of the input buffer. In other implementations, O is the lesser of R and I, wherein R is a running average occupancy level of the input buffer and I is an instantaneous occupancy level of the input buffer.

The method may also include these steps: determining an AQM threshold M based, at least in part, on N; determining a destination VOQ for the packet; and determining whether the destination VOQ contains M or more packets. M preferably decreases as the number of active VOQs increases. The packet may be forwarded to the destination VOQ when the destination VOQ contains fewer than M packets. When the destination VOQ contains M or more packets, an AQM action may be taken. The AQM action may involve dropping the packet, dropping a packet at the head of the destination VOQ, marking the packet and/or sending an explicit congestion notification.

Some aspects of the method involve the following steps: determining a plurality of AQM thresholds, each AQM threshold being based at least in part on a packet's class of service, determining a class of service of the packet; determining a destination VOQ for the packet; and determining whether the destination VOQ contains more packets than the AQM threshold for the determined class of service. An AQM action may be taken when the destination VOQ contains more packets than the AQM threshold for the determined class of service.

Alternative implementations of the invention provide another AQM method, comprising these steps: receiving an incoming packet; estimating an overall occupancy level O of an input buffer; computing a probability P based at least in part on the overall occupancy level; generating a random number R; setting a flag if R is less than P; determining an AQM threshold M; and determining whether a destination VOQ of the packet contains M or more packets. The packet may be sent to the destination VOQ when the destination VOQ contains fewer than M packets. An AQM action may be taken when the destination VOQ contains M or more packets. The AQM action may involve dropping the packet, dropping a packet at the head of the destination VOQ, marking the packet and/or sending an explicit congestion notification.

P may also be based in part upon a number of active VOQs. P preferably increases when the number of VOQs increases. O may be a running average occupancy level of the input buffer. O may also be the lesser of R and I, wherein R is a running average occupancy level of the input buffer and I is an instantaneous occupancy level of the input buffer. M preferably decreases as the number of active VOQs increases.

Alternative methods of the invention also involve managing input buffers in a network device. One such method includes these steps: determining a first range of values of N, where N is the number of active VOQs in an input buffer; determining a second range of values of N; assigning a first family of probabilistic drop functions to the first range of values; and assigning a second family of probabilistic drop functions to the second range of values. The first family of probabilistic drop functions are exponential functions of N and computed buffer occupancy C, whereas the second family of probabilistic drop functions are logarithmic functions of N and C. The method also includes the steps of determining N at a first time, determining a first probabilistic drop function corresponding to N and applying the first probabilistic drop function to manage the input buffer.

The first range of values may include smaller values of N than the second range of values. The method preferably involves computing at least one AQM threshold. A lower AQM threshold may be computed as N increases. One or more AQM thresholds may be applied to all active VOQs. Some aspects of the invention involve computing $1^{st}$ through $N^{th}$ AQM thresholds for $1^{st}$ through $N^{th}$ classes of service. The method may involve storing at least one of buffer occupancy data, active VOQ data and AQM threshold data.

Some aspects of the method include these steps: receiving a packet; determining an appropriate VOQ for the packet; determining a class of service for the packet; determining a corresponding AQM threshold for the class of service; and determining whether the occupancy of the appropriate VOQ exceeds the corresponding AQM threshold. An AQM action may be taken when it is determined that the occupancy of the appropriate VOQ exceeds the corresponding AQM threshold. The packet may be added to the appropriate VOQ when it is determined that the occupancy of the appropriate VOQ does not exceed the corresponding AQM threshold.

Alternative embodiments of the invention provide a network device that includes a plurality of ingress line cards, each of which is associated with at least one ingress port, and a plurality of egress line cards, each of which is associated with at least one egress port. Each of the ingress line cards comprises at least one input buffer and is configured to perform the following steps: receive an incoming packet; estimate an overall occupancy level O of an input buffer; determine a number N of active virtual output queues ("VOQs") of the input buffer; compute a probability P based on the overall occupancy level and the number of VOQs; generate a random number R; and set a flag when R is less than P.

Each of the ingress line cards may be configured to perform the following steps: determine an AQM threshold M based, at least in part, on N; determine a destination VOQ for the packet; and determine whether the destination VOQ contains M or more packets. The packet will be placed in the destination VOQ when the destination VOQ contains fewer than M packets. An AQM action will be taken when the destination VOQ contains M or more packets.

All of the foregoing methods, along with other methods of the present invention, may be implemented by software, firmware and/or hardware. For example, the methods of the present invention may be implemented by computer programs embodied in machine-readable media. Some aspects of the invention can be implemented by network devices or portions thereof, such as individual line cards.

DETAILED DESCRIPTION OF THE PREFERRED EMBODIMENTS

Figure 1:
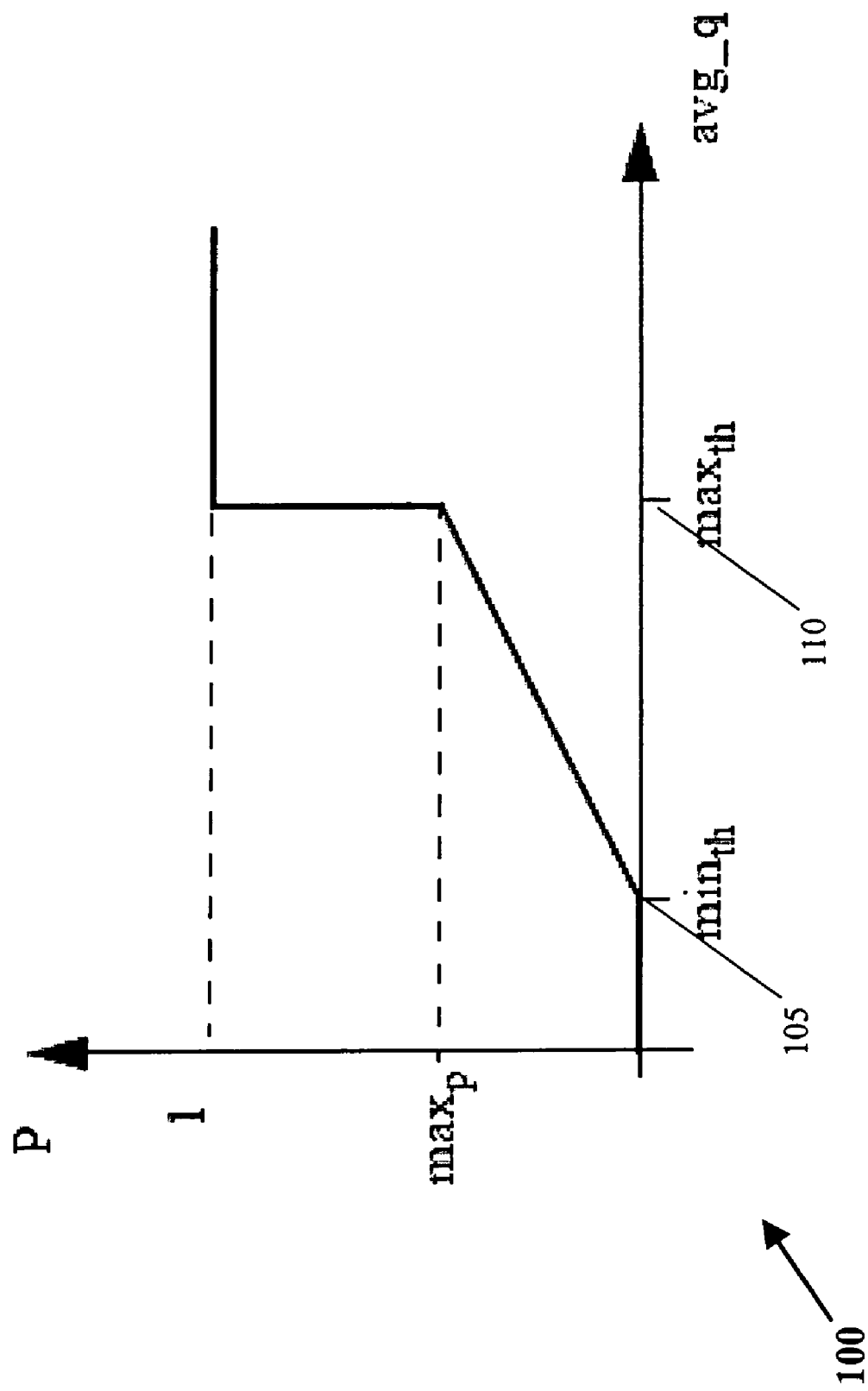
FIG. 1 is a graph illustrating the RED algorithm.

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

The present invention provides AQM methods and devices that are particularly suitable for input-buffered network devices, such as switches and routers. Some aspects of the present invention are particularly suitable for implementing a Low Latency Ethernet ("LLE") solution, also referred to herein as a Data Center Ethernet ("DCE") solution, which simplifies the connectivity of data centers and provides a high bandwidth, low latency network for carrying Ethernet and storage traffic. Some exemplary DCE methods and devices are described in the Cross-Referenced Applications. However, the present invention has wide applicability outside of the DCE context and is generally suitable for any network device, particularly for input-buffered network devices.

According to some aspects of the invention, the probability of setting a "global drop flag" depends, at least in part, on the lesser of a running average of overall buffer occupancy and instantaneous buffer occupancy. Exemplary methods of calculating overall buffer occupancy are described in detail below. As noted elsewhere herein, the global drop flag is not necessarily used to trigger packet drops, but may also be used to trigger other AQM responses, such as explicit congestion notification (e.g., as described in the Cross-Referenced Applications), packet marking, etc.

Preferred implementations of the invention control overall input buffer occupancy while protecting uncongested individual VOQs. Accordingly, preferred implementations of the invention perform the AQM operation only on packets destined for (or belonging to) VOQs that are effectively congested. Some such implementations use a threshold on the instantaneous VOQ length to discriminate between congested and uncongested VOQs. Accordingly, whether an AQM response is made preferably depends on both whether a global drop flag has been set and whether a destination VOQ contains M or more packets, where M is the threshold on the instantaneous VOQ length. Some implementations set different M values for different classes of traffic, e.g., with higher M values for higher-priority traffic.

It has also been observed that when many flows share the same buffer the drop probability should be higher than when just a few flows are active in order to control the average buffer occupancy. Therefore, some aspects of the invention provide an adaptive mechanism to adjust a probability curve (or select another probability curve) based on the number of active VOQs sharing a buffer. In such implementations, the probability of setting a global drop flag depends on the number of active VOQs. AQM responses (e.g., to drop packets) may be taken more aggressively when there is a larger number of VOQs. Therefore, M is preferably smaller when there is a larger number of active VOQs.

Figure 2:
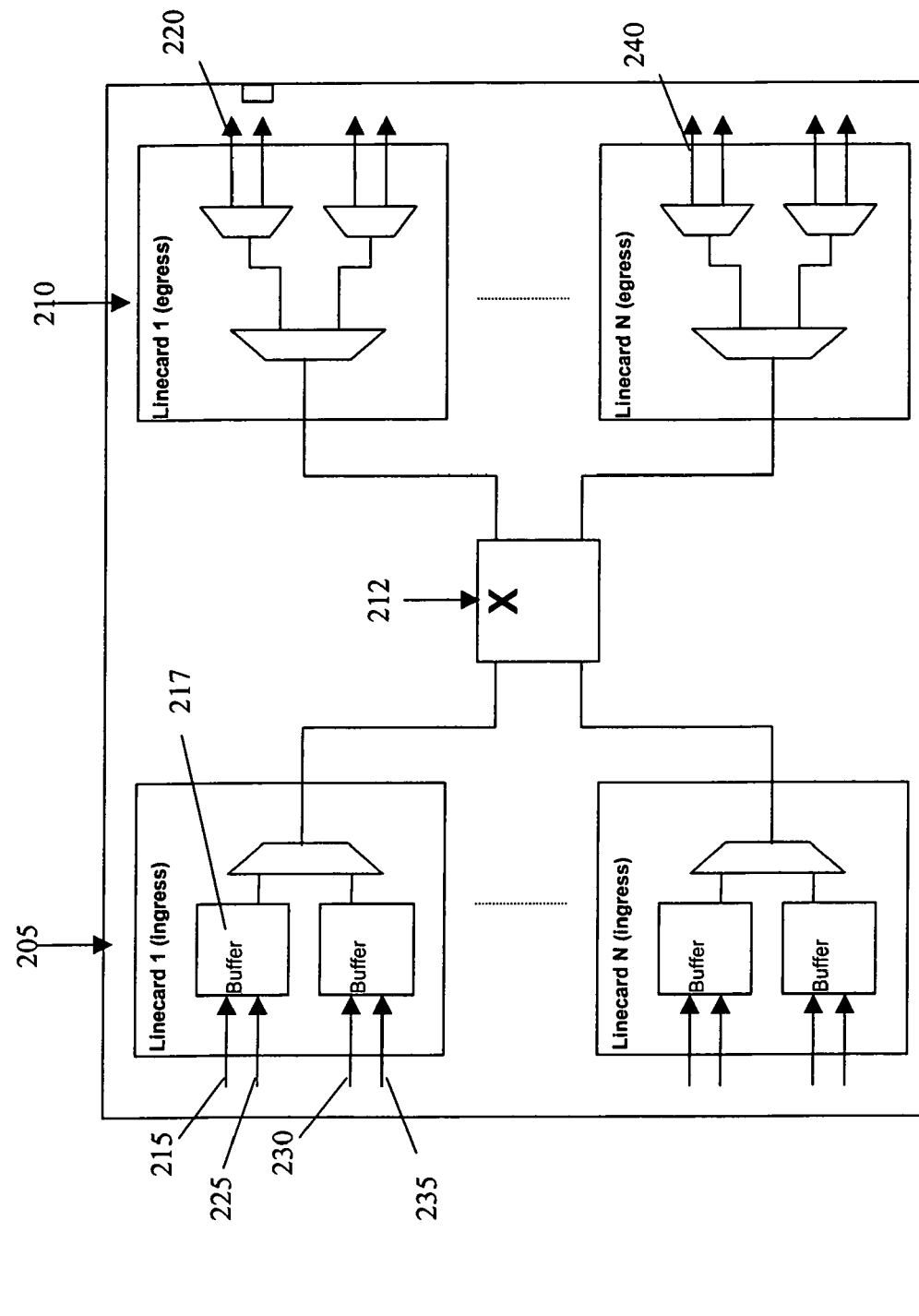
FIG. 2 is a simplified block diagram of an input-buffered network device.

FIG. 2 is a simplified block diagram illustrating an input-buffered network device 200 that can be configured in accordance with the present invention. Network device 200 includes ingress line cards 205 and egress line cards 210, interconnected via crossbar 212. In this example, input buffer 217 is receiving packets from source 215 that are being forwarded to uncongested links via port 220. Input buffer 217 is also receiving packets from sources 225, 230 and 235 that are being forwarded to uncongested links via other ports, including port 240. It is highly desirable that the flows to uncongested links are not inordinately slowed by the fact that flows to congested links are being processed by the same input buffer 217.

Figure 3:
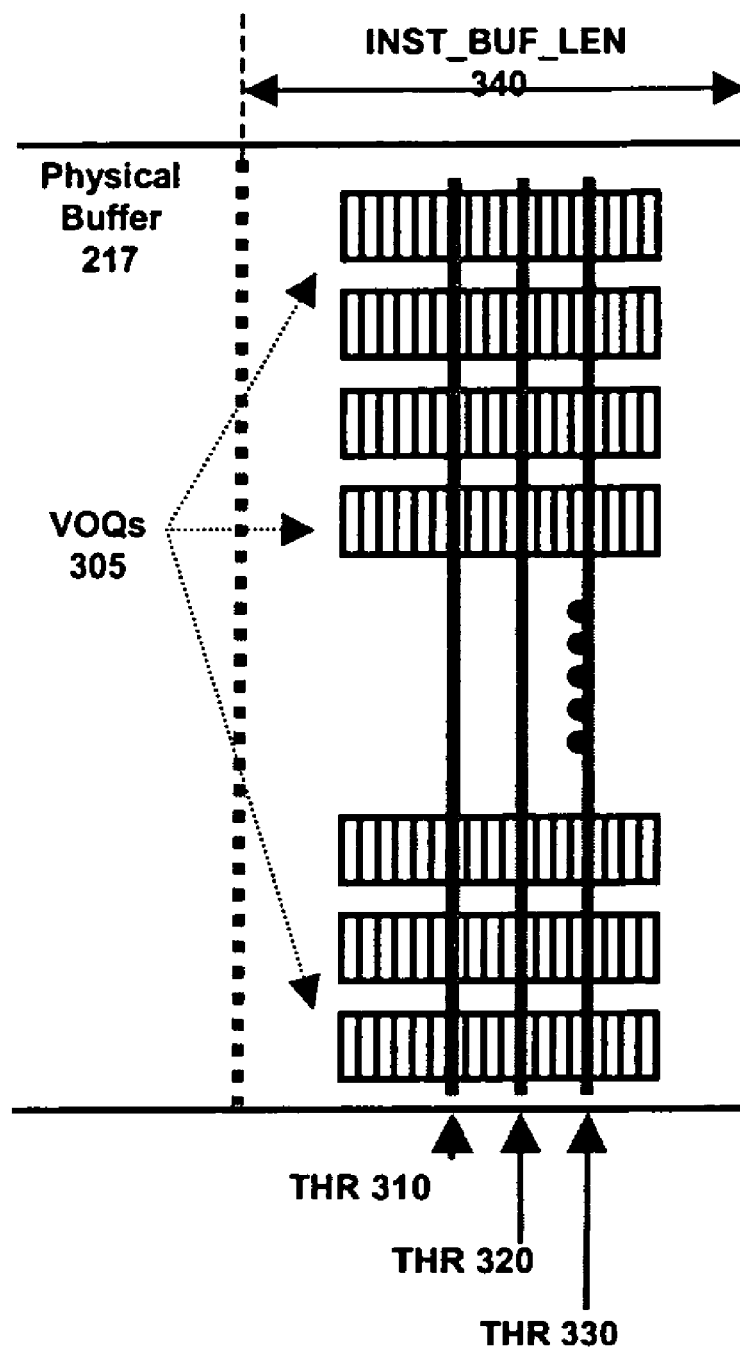
FIG. 3 illustrates a physical buffer shared by numerous virtual output queues.

FIG. 3 is a schematic diagram that illustrates multiple VOQs 305 within input buffer 217. As known by those of skill in the art, packets for each output destination will be assigned to a corresponding VOQ, each of which may include packets from more than one flow. In other words, the packets are organized into VOQs according to their output destination, regardless of where the packets originate.

FIG. 3 also illustrates global drop thresholds 310, 320 and 330. As will be discussed in more detail below, these drop thresholds indicate maximum numbers of packets M that may be in a VOQ before an AQM action is taken under certain conditions. Arrow 340 is intended to represent the instantaneous buffer occupancy at a particular time.

Figure 4:
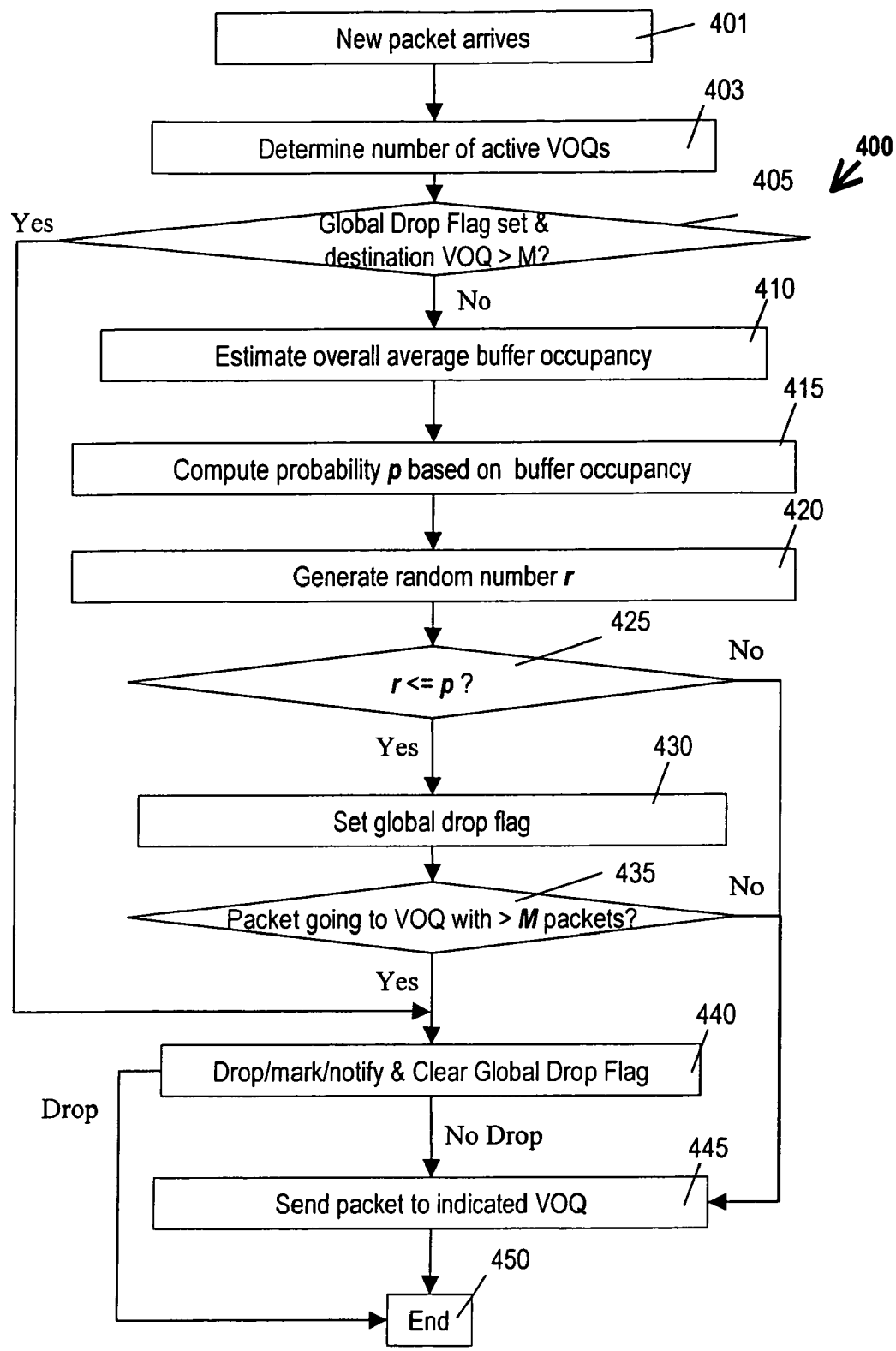
FIG. 4 is a flow chart that outlines some methods of the present invention.

An overview of some implementations of the invention will now be described with reference to the flow chart of FIG. 4. It will be appreciated by those of skill in the art that the steps illustrated and described herein are not necessarily performed in the order indicated. Moreover, it will be appreciated that some aspects of the invention may be performed using more (or fewer) steps than are indicated herein.

In step 401, a packet arrives at an input buffer. In step 403, the number of "active" VOQs, meaning the number of VOQs that have packets, is determined. As will be described in more detail below, the number of active VOQs may determine (at least in part) the value of an AQM threshold M, also referred to herein as a "drop threshold." In step 405 the global drop flag is evaluated: if the flag is set and the length of the VOQ the packet is going to be added to is larger than a drop threshold M, step 440 (described later) is taken. Otherwise, the overall average buffer occupancy is then determined. (Step 410.) In some implementations, step 403 and/or step 410 is not made in response to a packet's arrival, but instead the determination is made upon the occurrence of another event or at a fixed time interval.

In some implementations of the invention, at least step 410 (and possibly other steps, such as step 403) is performed at fixed time intervals T. T may be set to any convenient time, for example, a time that is comparable with the transmission time of an MTU frame on the egress interface. For example, T would be 1.2 μs if a 1500-byte frame were transmitted at 10 Gbps.

Performing such calculations at fixed time intervals can be advantageous as compared to having the computations triggered by a packet's arrival. For example, when an idle period follows a busy period and these computations are triggered by a packet's arrival, the overall buffer occupancy calculation is not updated until the first packet arrival after the idle period. In this case, the calculated overall buffer occupancy could remain high even if the instantaneous queue size were actually close to or at zero. Therefore, if the average queue size were still larger than the minimum threshold, packets would continue to be discarded even if the queue were empty. This would cause lower throughput because the link would become underutilized.

Some implementations of the invention compute an overall average buffer occupancy AVG_BUF_LEN, which is calculated according to the following exponential weighted moving average:

$$\text{AVG\_BUF\_LEN} = \text{AVG\_BUF\_LEN}_{OLD} *(1-W) + \text{INST\_BUF\_LEN}*W \quad \text{(Equation 1)}$$

In Equation (1), INST_BUF_LEN is the instantaneous buffer occupancy and W is a weight that determines the sensitivity of AVG_BUF_LEN to the instantaneous fluctuations in the buffer occupancy. In some preferred implementations, W is a relatively small number (e.g., in the range of 0.001 to 0.1), such that AVG_BUF_LEN has a relatively low sensitivity to instantaneous fluctuations in the buffer occupancy.

However, some implementations of the invention provide for a sensitivity to instantaneous decreases in the buffer occupancy. Preferably, the calculated value for the overall buffer occupancy should be quickly reduced when the instantaneous queue size decreases rapidly. Otherwise, packets could unnecessarily be discarded, e.g., as explained above. Therefore, some implementations of the invention consider the overall buffer occupancy to be the lesser of a calculated rolling average buffer occupancy and an instantaneous buffer occupancy. In some such implementations, at any given time the computed buffer occupancy (COMP_BUF_LEN) is defined as the minimum of the average and the instantaneous buffer occupancy:

$$\text{COMP\_BUF\_LEN} = \min(\text{AVG\_BUF\_LEN}, \text{INST\_BUF\_LEN}) \quad \text{(Equation 2)}$$

In step 415, the probability of setting a global drop flag is calculated. This probability is preferably a function of the computed overall buffer occupancy, e.g., of COMP_BUF_LEN. However, some aspects of the present invention provide more sophisticated methods of calculating such a probability. Some such aspects of the invention have been implemented in response to the observation that packets need to be dropped more aggressively when many flows share the same buffer. To implement such a behavior, the probability has been turned into a function of two variables, i.e., the computed buffer occupancy (COMP_BUF_LEN) determined in step 410 and the number of active VOQs (N_ACT_VOQ) determined in step 405.

Accordingly, in some implementations of the invention, for every packet arrival a drop probability p is calculated as follows:

$$p = P(\text{COMP\_BUF\_LEN}, \text{N\_ACT\_VOQ}) \quad \text{(Equation 3)}$$

Figure 5:
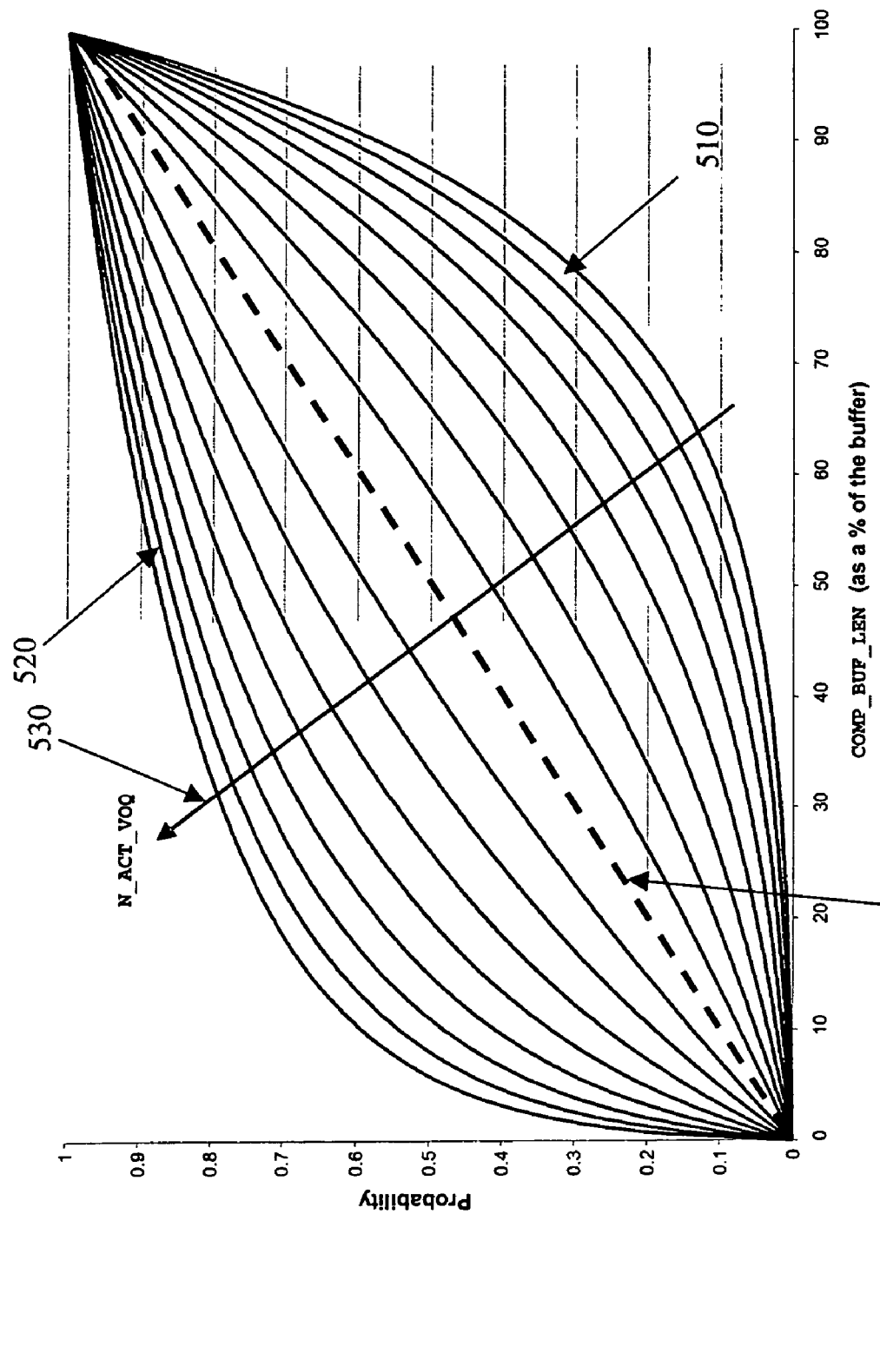
FIG. 5 illustrates two subfamilies of probability curves according to some implementations of the invention.

In Equation 3, P (,) is a probability function. Although many such probability functions are within the scope of the invention, FIG. 5 illustrates a probability function 500 according to one such aspect of the invention. The family of curves shown in FIG. 5 is composed of two subfamilies, subfamily 510 and subfamily 520. Subfamily 510 is associated with exponential functions of the following kind:

$$p = k(f(\text{N\_ACT\_VOQ})^{g(\text{COMP\_BUF\_LEN})} - 1) \quad \text{(Equation 4)}$$

In Equation 4, k is a constant scaling factor, $f$ is a function that returns a base for the exponentiation dependent on the number of active VOQs and g is a function that returns an exponent dependent on the current computed average buffer occupancy. The functions $f$ and g may be simple linear functions or more complex non-linear functions, used for example to emphasize the precision on the calculation of the probability for small values of N_ACT_VOQ and COMP_BUF_LEN.

Subfamily 520 is associated with logarithmic functions of the following kind:

$$p = \log_{f(\text{N\_ACT\_VOQ})}(g(\text{COMP\_BUF\_LEN}) - 1) \quad \text{(Equation 5)}$$

As indicated by arrow 530, when the number of active VOQs increases beyond a predetermined range, the probability function is switched from exponential subfamily 510 to logarithmic subfamily 520. The rationale in doing so is based on the fact that when a few flows share the buffer, it is important to keep the probability of dropping packets very low when the buffer occupancy is low, but also to increase the probability rapidly as the buffer occupancy increases. Accordingly, for small values of N_ACT_VOQ, a probability function is appropriate that increases less rapidly than linear function 550 for small values of COMP_BUF_LEN and that increases more rapidly than linear function 550 for larger values of COMP_BUF_LEN (with an overall concave-upwards form).

Conversely, when many flows share the buffer, it is preferable to start dropping packets aggressively even with a low buffer occupancy. Therefore, for larger values of N_ACT_VOQ, a probability function is appropriate that increases more rapidly than linear function 550, even for small values of COMP_BUF_LEN (with an overall concave-downwards form). It has been observed that if a gentler probability function is used with many flows, it is very likely that a substantial portion of them will be unaffected by drops or other AQM responses. Consequently, these flows may be allowed to open their window enough to saturate the buffer in case of TCP flows, or cause buffer overflows because not enough packets are dropped in case of traffic via other protocols.

Referring again to FIG. 4, in step 420 a random number r in the range [0, 1] is generated. The random number is then compared to p. (Step 425.) If r>p, the packet is included in the VOQ for its indicated destination. (Step 445.)

However, if r=<p, a global drop flag is set. (Step 430.) A "drop flag" indicates that a conditional decision has been made to implement an AQM response. The AQM response could be, for example, a head of line packet drop, a tail packet drop and/or another AQM response such as an explicit congestion notification, e.g., as described in the Cross-Referenced Applications.

In step 435, at least one AQM threshold M is checked. An AQM threshold indicates a maximum number of packets that may be stored in a VOQ before the application of an AQM action, such as dropping a packet. In the "tail drop" example of method 400, it is determined in step 435 whether the incoming packet is destined for a VOQ having a number of packets that is greater than M. If the indicated VOQ has M or fewer packets, the packet is placed in the VOQ. (Step 445.) If the indicated VOQ has more than M packets, an AQM action is taken (e.g., the packet is dropped) and the global drop flag is reset (step 440).

The invention may also be applied to implementations involving the dropping of packets from the head of a VOQ. Instead of determining whether to discard or enqueue an incoming packet, a decision can be made regarding the disposition of a packet at the head of a VOQ.

The rationale behind this behavior is that if a packet is scheduled (or would be scheduled) for transmission from a "long" VOQ (based on its length exceeding drop threshold M), it is very likely that such VOQ is congested and it is therefore contributing to the overall buffer congestion. Thus, it is appropriate to drop the next packet coming out of such VOQ (or the next packet that would have been placed in the VOQ). Conversely, if the VOQ is nearly empty, there is no point in dropping a packet going to (or coming from) that VOQ, as the traffic therein stored is unlikely to be a contributor to the buffer congestion.

In some implementations, a relatively low N_ACT_VOQ will result in a relatively high value of M. For example, if N_ACT_VOQ is low, M could be set to level 310 of FIG. 3. Conversely, a relatively high N_ACT_VOQ will result in a relatively low value of M. For example, if N_ACT_VOQ is high, M could be set to level 330 of FIG. 3.

Some implementations of the invention involve the establishment of multiple drop thresholds $M_1$ through $M_N$ for a single value of N_ACT_VOQ. In some such implementations, if the priority and/or service class of the packet is relatively higher, then M will be relatively larger. For example, thresholds 310, 320 and 330 of FIG. 3 could all be used for a single value of N_ACT_VOQ. Threshold 310 could be used for packets with a relatively high service class or priority and threshold 330 could be used for packets with a relatively low service class or priority. By having different thresholds on a per priority basis, a different drop priority or weight is provided for, e.g., different classes of traffic, for control frames vs. data frames, etc.

The algorithms described herein are sufficiently simple to be implemented in hardware in a straightforward way. In some preferred implementations, the probability function P (,) is implemented with a lookup table, because performing the calculations for Equations 4 and 5 in hardware would require very fast processing (e.g., a very fast FPU). However, in some cases a lookup table might not be feasible. Moreover, the table for drop thresholds may use considerable space, because it is to be indexed by the number of active VOQs.

Therefore, a compression of the COMP_BUF_LEN and N_ACT_VOQ values can be advantageous in order to save memory space. The simplest form of compression can be achieved by linear quantization, i.e., by removing a certain number of LSBs from the aforementioned values.

Figure 6:
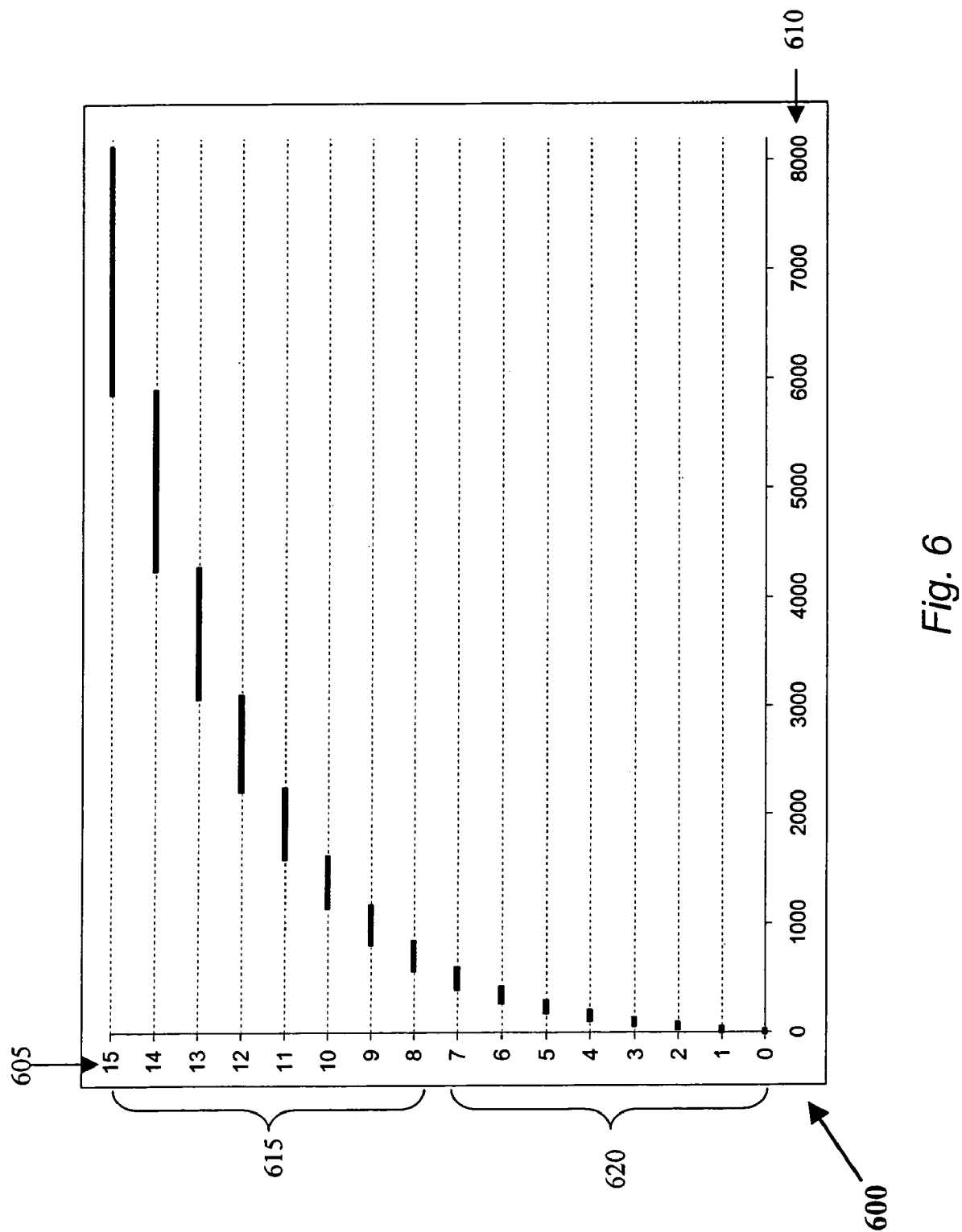
FIG. 6 is one illustrative quantization function that may be used to implement some aspects of the invention.

Some extra space can be saved if a more sophisticated non-linear quantization technique is employed for compressing data, e.g. for compressing the values of COMP_BUF_LEN, N_ACT_VOQ and/or corresponding AQM threshold data. One such non-linear quantization technique will now be described with reference to FIG. 6. The vertical axis 605 of graph 600 indicates the number of individual probability curves and horizontal axis 610 indicates numbers of active VOQs. Here, curves 615 correspond with the logarithmic subfamily of curves 520 of FIG. 5 and curves 620 correspond with exponential subfamily 510. For example, by using the non-linear quantization function shown in FIG. 6, which maps 8192 values on 16 values, the size of the probability table will be 16×16×8 bits=2048 bit.

A hybrid approach may also be employed by, for example, using an 8-bit linearly quantized value for COMP_BUF_LEN and a 4-bit non-linearly quantized value for N_ACT_VOQ. In this example, the probability table would be as large 256×16×8=32 Kbit, and the threshold table would be as large as 16×13×3=624 bit. This exemplary non-linear quantization function can be implemented, for example, with a lookup table 8192×4=32 Kbit large or as a battery of 15 13-bit comparators plus an encoder, if "silicon real estate" is an issue.

Figure 7:
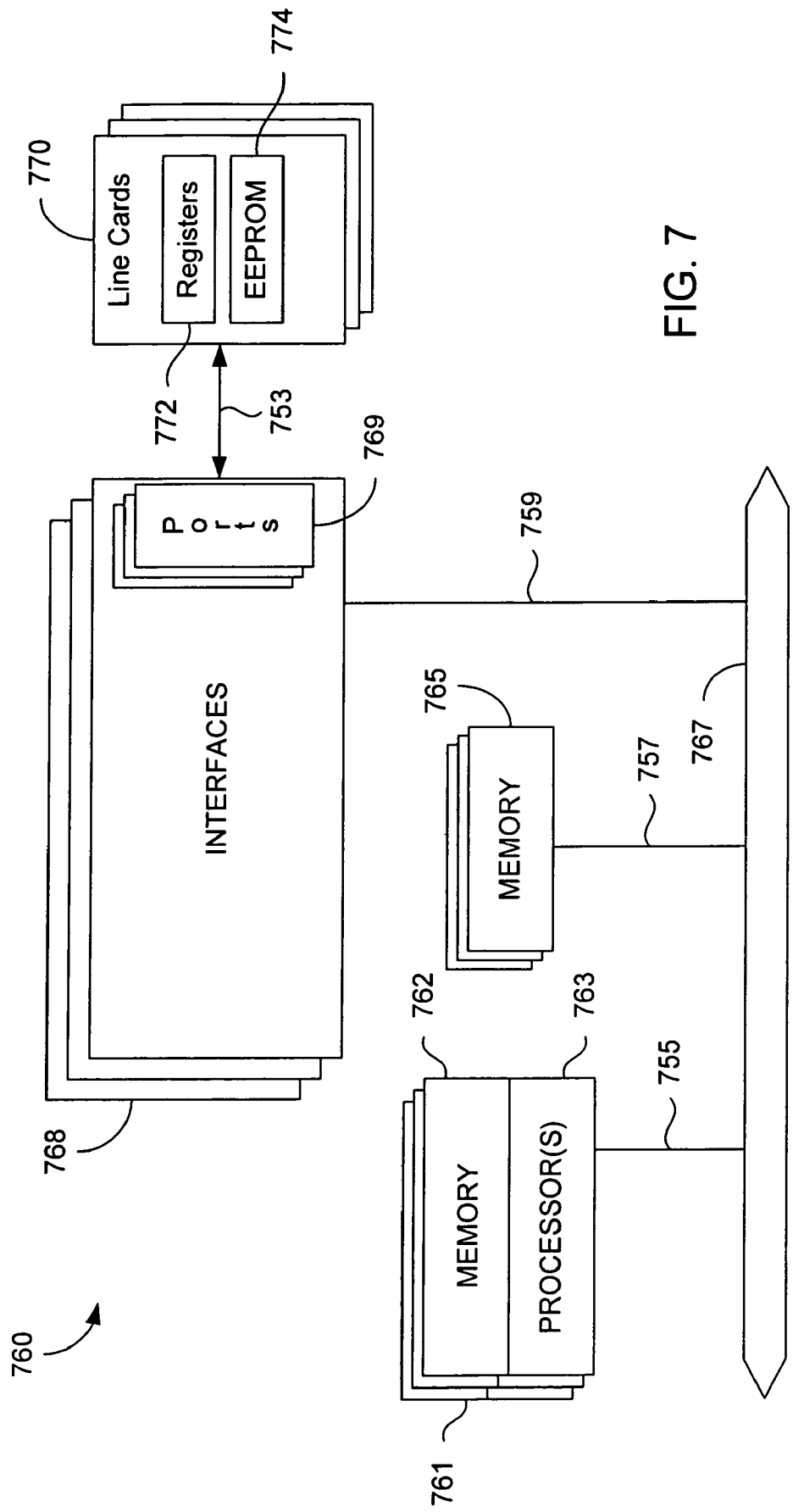
FIG. 7 is a network device that may be configured to implement some aspects of the invention.

FIG. 7 illustrates an example of a network device that may be configured to implement some methods of the present invention. Network device 760 includes a master central processing unit (CPU) 762, interfaces 768, and a bus 767 (e.g., a PCI bus). Generally, interfaces 768 include ports 769 appropriate for communication with the appropriate media. In some embodiments, one or more of interfaces 768 includes at least one independent processor 774 and, in some instances, volatile RAM. Independent processors 774 may be, for example ASICs or any other appropriate processors. According to some such embodiments, these independent processors 774 perform at least some of the functions of the logic described herein. In some embodiments, one or more of interfaces 768 control such communications-intensive tasks as media control and management. By providing separate processors for the communications-intensive tasks, interfaces 768 allow the master microprocessor 762 efficiently to perform other functions such as routing computations, network diagnostics, security functions, etc.

The interfaces 768 are typically provided as interface cards (sometimes referred to as "line cards"). Generally, interfaces 768 control the sending and receiving of data packets over the network and sometimes support other peripherals used with the network device 760. Among the interfaces that may be provided are Fibre Channel ("FC") interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 762 may be responsible for implementing specific functions associated with the functions of a desired network device. According to some embodiments, CPU 762 accomplishes all these functions under the control of software including an operating system (e.g. Linux, VxWorks, etc.), and any appropriate applications software.

CPU 762 may include one or more processors 763 such as a processor from the Motorola family of microprocessors or the MIPS family of microprocessors. In an alternative embodiment, processor 763 is specially designed hardware for controlling the operations of network device 760. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

Regardless of network device's configuration, it may employ one or more memories or memory modules (such as, for example, memory block 765) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 7 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/ line cards may be bus based (as shown in FIG. 7) or switch fabric based (such as a cross-bar).

Other Embodiments

Although illustrative embodiments and applications of this invention are shown and described herein, many variations and modifications are possible which remain within the concept, scope, and spirit of the invention, and these variations would become clear to those of ordinary skill in the art after perusal of this application.

Accordingly, the present embodiments are to be considered as illustrative and not restrictive, and the invention is not to be limited to the details given herein, but may be modified within the scope and equivalents of the appended claims.

We claim:

1. An active queue management ("A QM",) method for input buffer of a network device, comprising
   receiving an incoming packet;
   estimating at ingress line card an overall occupancy level O of an input buffer;
   determining a number N of active virtual output queues ("VOQs") of the input buffer;
   computing a probability P based on the overall occupancy level and the number of active VOQs;
   generating a random number R; and
   setting a flag when R is less than P.

2. The method of claim 1, wherein P increases when N increases.

3. The method of claim 1, wherein O is a running average occupancy level of the input buffer.

4. The method of claim 1, wherein O is the lesser of R and I, wherein R is a running average occupancy level of the input buffer and I is an instantaneous occupancy level of the input buffer.

5. The method of claim 1, further comprising:
   determining an AQM threshold M based, at least in part, on N;
   determining a destination VOQ for the packet; and
   determining whether the destination VOQ contains M or more packets.

6. The method of claim 1, further comprising:
   determining a plurality of AQM thresholds, each AQM threshold being based at least in part on a packet's class of service,
   determining a class of service of the packet;
   determining a destination VOQ for the packet; and
   determining whether the destination VOQ contains more packets than the AQM threshold for the determined class of service.

7. The method of claim 5, further comprising the step of forwarding the packet to the destination VOQ when the destination VOQ contains fewer than M packets.

8. The method of claim 5, further comprising the step of taking an AQM action when the destination VOQ contains M or more packets.

9. The method of claim 5, wherein M decreases as the number of active VOQs increases.

10. The method of claim 6, further comprising the step of taking an AQM action when the destination VOQ contains more packets than the AQM threshold for the determined class of service.

11. The method of claim 7, wherein the AQM action comprises at least one of dropping the packet, dropping a packet at the head of the destination VOQ, marking the packet and sending an explicit congestion notification.

12. An active queue management ("A QM",) method for input buffer of a network device, comprising
    receiving an incoming packet;
    estimating at ingress line card an overall occupancy level O of an input buffer;
    computing a probability P based at least in part on the overall occupancy level;
    generating a random number R;
    setting a flag if R is less than P;
    determining an AQM threshold M; and
    determining whether a destination virtual output queue ("VOQ") of the packet contains M or more packets.

13. The method of claim 12, further comprising the step of sending the packet to the destination VOQ when the destination VOQ contains fewer than M packets.

14. The method of claim 12, further comprising the step of taking an AQM action when the destination VOQ contains M or more packets.

15. The method of claim 12, wherein P is also based in part upon a number of active VOQs.

16. The method of claim 12, wherein O is a running average occupancy level of the input buffer.

17. The method of claim 12, wherein O is the lesser of R and I, wherein R is a running average occupancy level of the input buffer and I is an instantaneous occupancy level of the input buffer.

18. The method of claim 12, wherein M decreases as the number of active VOQs increases.

19. The method of claim 14, wherein the AQM action comprises at least one of dropping the packet, dropping a packet at the head of the destination VOQ, marking the packet and sending an explicit congestion notification.

20. The method of claim 15, wherein P increases when the number of VOQs increases.

21. A method of managing input buffers in a network device, the method comprising:
    determining a first range of values of N, where N is the number of active virtual output queues (VOQs) in an input buffer;
    determining a second range of values of N,
    assigning a first family of probabilistic drop functions to the first range of values, the first family of probabilistic drop functions being exponential functions of N and computed buffer occupancy C, and
    assigning a second family of probabilistic drop functions to the second range of values, the second family of probabilistic drop functions being logarithmic functions of N and C;
    determining N at a first time;
    determining a first probabilistic drop function corresponding to N, and
    applying the first probabilistic drop function to manage the input buffer.

22. The method of claim 21, wherein the first range of values comprises smaller values of N than the second range of values.

23. The method of claim 21, further comprising the step of computing at least one active queue management ("AQM") threshold.

24. The method of claim 23, wherein the computing step comprises computing a lower AQM threshold as N increases.

25. The method of claim 23, further comprising the step of applying at least one AQM threshold to all active VOQs.

26. The method of claim 23, further comprising the step of computing 1st through $N^{th}$ AQM thresholds for $1^{st}$ through $N^{th}$ classes of service.

27. The method of claim 26, further comprising:
receiving a packet;
determining an appropriate VOQ for the packet;
determining a class of service for the packet;
determining a corresponding AQM threshold for the class of service; and
determining whether the occupancy of the appropriate VOQ exceeds the coffesponding AQM threshold.

28. The method of claim 26, further comprising the step of storing at least one of buffer occupancy data, active VOQ data and AQM threshold data.

29. The method of claim 27, further comprising the step of taking an AQM action when it is determined that the occupancy of the appropriate VOQ exceeds the corresponding AQM threshold.

30. The method of claim 27, further comprising the step of adding the packet to the appropriate VOQ when it is determined that the occupancy of the appropriate VOQ does not exceed the corresponding AQM threshold.

31. A network device, comprising:
a plurality of ingress line cards, each line card associated with at least one ingress port; and
a plurality of egress line cards, each line card associated with at least one egress port;
wherein each of the plurality of ingress line cards comprises at least one input buffer and is configured to perform the following steps:
receive an incoming packet;
estimate an overall occupancy level O of an input buffer;
determine a number N of active virtual output queues ("VOQs") of the input buffer;
compute a probability P based on the overall occupancy level and the number of active VOQs;
generate a random number R; and
set a flag when R is less than P.

32. The network device of claim 31, wherein each of the plurality of ingress line cards is further configured to perform the following steps:
determine an AQM threshold M based, at least in part, on N,
determine a destination VOQ for the packet; and
determine whether the destination VOQ contains M or more packets.

33. The network device of claim 32, wherein each of the plurality of ingress line cards is further configured to forward the packet to the destination VOQ when the destination VOQ contains fewer than M packets.

34. The network device of claim 32, wherein each of the plurality of ingress line cards is further configured to take an AQM action when the destination VOQ contains M or more packets.

35. A network device, comprising:
means for receiving an incoming packet;
means for estimating an overall occupancy level O of an input buffer;
means for computing a probability P based at least in part on the overall occupancy level;
means for generating a random number R;
means for setting a flag if R is less than P;
means for determining an AQM threshold M; and
means for determining whether a destination virtual output queue ("VOQ") of the packet contains M or more packets.

36. The network device of claim 35, further comprising means for sending the packet to the destination VOQ when the destination VOQ contains fewer than M packets.

37. The network device of claim 35, further comprising means for taking an AQM action when the destination VOQ contains M or more packets.

* * * * *

UNITED STATES PATENT AND TRADEMARK OFFICE
CERTIFICATE OF CORRECTION

PATENT NO. : 7,602,720 B2  Page 1 of 1
APPLICATION NO. : 11/155388
DATED : October 13, 2009
INVENTOR(S) : Bergamasco et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 922 days.

Signed and Sealed this

Fifth Day of October, 2010

David J. Kappos
*Director of the United States Patent and Trademark Office*